United States Patent
Pearce

(10) Patent No.: US 10,748,219 B2
(45) Date of Patent: Aug. 18, 2020

(54) METHOD AND SYSTEM FOR DYNAMICALLY CHANGING AUTOMOBILE INSURANCE

(71) Applicant: ONOFF, Inc., Conroe, TX (US)

(72) Inventor: Richard J. Pearce, Conroe, TX (US)

(73) Assignee: ONOFF, INC., Conroe, TX (US)

( * ) Notice: Subject to any disclaimer, the term of this patent is extended or adjusted under 35 U.S.C. 154(b) by 0 days.

(21) Appl. No.: 16/242,413

(22) Filed: Jan. 8, 2019

(65) Prior Publication Data

US 2020/0219198 A1 Jul. 9, 2020

(51) Int. Cl.
*G06Q 40/08* (2012.01)
*G07C 5/00* (2006.01)

(52) U.S. Cl.
CPC ............ *G06Q 40/08* (2013.01); *G07C 5/008* (2013.01)

(58) Field of Classification Search
CPC ................................ G06Q 40/08; G07C 5/008
See application file for complete search history.

(56) References Cited

U.S. PATENT DOCUMENTS

| | | | |
|---|---|---|---|
| 6,064,970 A | 5/2000 | McMillan et al. | |
| 7,124,088 B2 | 10/2006 | Bauer et al. | |
| 7,395,219 B2 | 7/2008 | Strech | |
| 7,885,832 B2 | 2/2011 | Collins et al. | |
| 8,005,734 B1 | 8/2011 | Strech | |
| 8,566,127 B1 | 10/2013 | Strech | |
| 8,930,231 B2 | 1/2015 | Bowne et al. | |
| 10,366,370 B1* | 7/2019 | Binion | G06Q 30/014 |
| 2003/0191581 A1* | 10/2003 | Ukai | G01S 5/0027 705/4 |
| 2007/0055553 A1* | 3/2007 | Kwan | G01C 21/34 705/4 |
| 2011/0004493 A1 | 1/2011 | Bradshaw et al. | |
| 2013/0179198 A1 | 7/2013 | Bowne et al. | |
| 2019/0057453 A1* | 2/2019 | Yang | H04W 4/029 |

FOREIGN PATENT DOCUMENTS

| | | | |
|---|---|---|---|
| CA | 2518482 | 3/2007 | |
| WO | WO-0058915 A1 * | 10/2000 | G07C 5/0858 |

OTHER PUBLICATIONS

Bergland, Andrew. Daily News[Prince Rupert, B.C] Dec. 21, 2009: 5. (Year: 2009).*

* cited by examiner

*Primary Examiner* — Namrata Boveja
*Assistant Examiner* — Carol A See
(74) *Attorney, Agent, or Firm* — The Concept Law Group, PA; Scott D. Smiley; Scott M. Garrett

(57) ABSTRACT

A mobile device automatically determines the identity of a proximate automobile that has been activated, and further determines whether the automobile presently has active insurance coverage as one automobile of a multi-automobile policy. If the automobile has only base coverage, then the user is presented with a selection screen for activing coverage in order to comply with insurance requirements to operate the automobile on public roadways. Similarly, when the owner/user knows they will not be using the automobile for a long or indefinite period of time, then the active insurance can be turned off or transferred to another automobile on the multi-automobile policy.

10 Claims, 10 Drawing Sheets

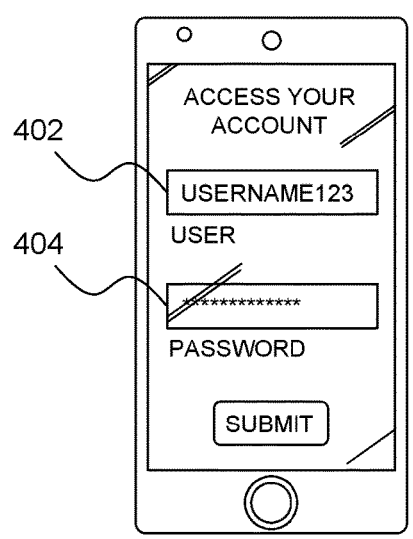
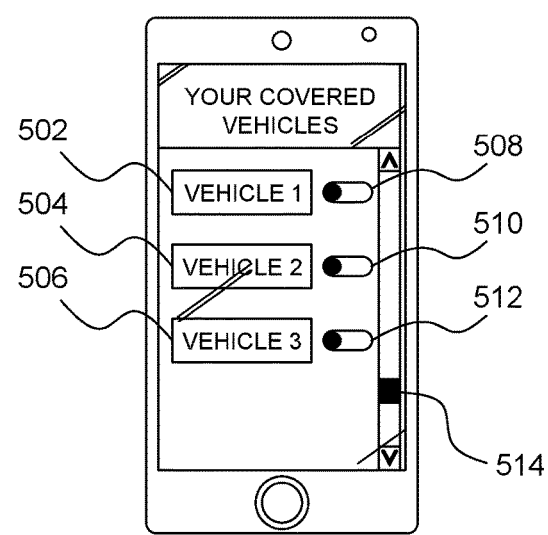
FIG.4
FIG.5

METHOD AND SYSTEM FOR DYNAMICALLY CHANGING AUTOMOBILE INSURANCE

FIELD OF THE INVENTION

The present invention relates generally to a system and method for dynamically determining an active automobile for updating insurance information for a plurality of commonly owned automobiles, and, more particularly, relates to verifying that a selected or indicated automobile covered by an insurance policy is in use.

BACKGROUND OF THE INVENTION

It is not uncommon for a person or family to own multiple automobiles. Some people have a collectible or sport automobile in addition to a commuter automobile used for daily/weekday driving. Some people collect automobiles and have several automobiles in their collection. Since each automobile is an asset, it is desirable to insure each automobile. In many jurisdictions insurance is required to drive an automobile on public roadways. Although some insurance companies provide a discount for insuring multiple vehicles together on one policy, each automobile is essentially fully covered, even though it is not possible for a person to drive more than one automobile at a time.

At the same time, insurance companies would like to offer more competitive discounts, but have no way of verifying which automobile covered under a policy is being driven, driven the most, rarely driven, etc. Thus, they have to assume any car owned by a person could be driven at any time.

Therefore, a need exists to overcome the problems with the prior art as discussed above.

SUMMARY OF THE INVENTION

The invention provides a method and system for dynamically changing automobile insurance coverage that overcomes the hereinafore-mentioned disadvantages of the heretofore-known devices and methods of this general type and that allows a policy holder having several automobiles to select one or more for active coverage in order to drive the automobile on public roadways, and to deactivate active coverage when an automobile is not going to be driven by the policy holder.

With the foregoing and other objects in view, there is provided, in accordance with some embodiments a method for dynamically updating and verifying an active automobile designation for a multi-automobile insurance policy that includes accessing, by a mobile device, insurance information associated with an account maintained by an insurance company. The insurance information can include a plurality of vehicle records associated with an insurance policy provided by the insurance company. The plurality of vehicle records each include a data field indicating whether the corresponding vehicle is presently an actively covered vehicle or a base covered vehicle. The method can further include displaying, by the mobile device, a plurality of interface objects on a display of the mobile device, each one of the plurality of interface objects corresponding to a respective one of the plurality of vehicle records. The method can further include receiving, at the mobile device, a selection of one of the plurality of interface objects. The selection indicates that the vehicle corresponding to the selected one of the plurality of interface objects is to be an actively covered vehicle. The method can further include, subsequent to receiving the selection, the mobile device automatically acquiring, by other than manual entry, an identifier of the vehicle. The mobile device can determine whether the received identifier corresponds to an actively covered vehicle associated with the insurance policy. The mobile device can issue a notification indicating whether, based on the identifier, the vehicle is actively covered.

In accordance with a further feature, automatically acquiring the identifier of the vehicle can include connecting to a personal area wireless network transceiver of the vehicle.

In accordance with a further feature, acquiring the identifier can include acquiring a media access controller address of the personal area wireless network transceiver as the identifier.

In accordance with a further feature, the personal area wireless network transceiver can provide the identifier to the mobile device as a vehicle identification number.

In accordance with a further feature, automatically acquiring the identifier of the vehicle can include the mobile device connecting to a telematics unit of the vehicle and receiving the identifier from the telematics unit.

In accordance with a further feature, the identifier provided by the telematics unit can be a vehicle identification number of the vehicle.

In accordance with a further feature, automatically acquiring the identifier of the vehicle can include connecting a personal area network transceiver that is connected to an on board diagnostic connector of the vehicle and receiving the identifier from the personal area network transceiver that is connected to an on board diagnostic connector.

In accordance with a further feature, automatically acquiring the identifier of the vehicle can include performing an image recognition process on an image captured by the mobile device and recognizing the identifier in the image.

In accordance with a further feature, the image is an image of a license tag of the vehicle, recognizing the identifier in the image can include recognizing a license tag number of the license tag.

In accordance with a further feature, the image is an image of a pictographic code associated with the vehicle, recognizing the identifier in the image can include recognizing the pictographic code and decoding information from the pictographic code to obtain the identifier.

In accordance with some embodiments there is provided a method for dynamically updating information for an automobile insurance policy for a plurality of automobiles to indicate an actively covered one of the plurality of automobiles including receiving, at a mobile device, an identifier associated with a specific automobile. The method can further include the mobile device transmitting the identifier to a policy management processor, the policy management processor being configured to manage and determine a premium for a policy covering the specific automobile and at least one other automobile. The method can further include, in response to receiving the identify from the mobile device, the policy management processor updating a record associated with the specific automobile to indicate that the specific automobile is active and in use. The method can further include the policy management processor determining a premium based on the specific automobile being active for a period of time.

In accordance with a further feature, receiving the identifier of the specific automobile can include the mobile device detecting a connection to a personal area wireless network transceiver of the specific automobile.

In accordance with a further feature, receiving the identifier can include receiving a media access controller address of the personal area wireless network transceiver as the identifier.

In accordance with a further feature, the personal area wireless network transceiver provides the identifier to the mobile device as a vehicle identification number.

In accordance with a further feature, receiving the identifier of the specific automobile can include the mobile device detecting and connecting to a telematics unit of the specific automobile and receiving the identifier from the telematics unit.

In accordance with a further feature, the identifier provided by the telematics unit is a vehicle identification number of the specific automobile.

In accordance with a further feature, automatically receiving the identifier of the specific automobile can include connecting a personal area network transceiver that is connected to an on board diagnostic connector of the specific automobile and receiving the identifier from the personal area network transceiver that is connected to an on board diagnostic connector.

In accordance with a further feature, receiving the identifier of the specific automobile can include performing an image recognition process on an image captured by the mobile device and recognizing the identifier in the image.

In accordance with a further feature, the image is an image of a license tag of the specific automobile, recognizing the identifier in the image comprises recognizing a license tag number of the license tag.

In accordance with a further feature, the image is an image of a pictographic code associated with the specific automobile, recognizing the identifier in the image comprises recognizing the pictographic code and decoding information from the pictographic code to obtain the identifier.

Although the invention is illustrated and described herein as embodied in a method and system for dynamically changing automobile insurance, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 is an interface diagram for displaying a login screen to allow a user to dynamically change automobile insurance coverage, in accordance with some embodiments;

FIG. 5 is an interface diagram for displaying a selection screen for changing active insurance coverage for an automobile, in accordance with some embodiments;

DETAILED DESCRIPTION

Figure 1:
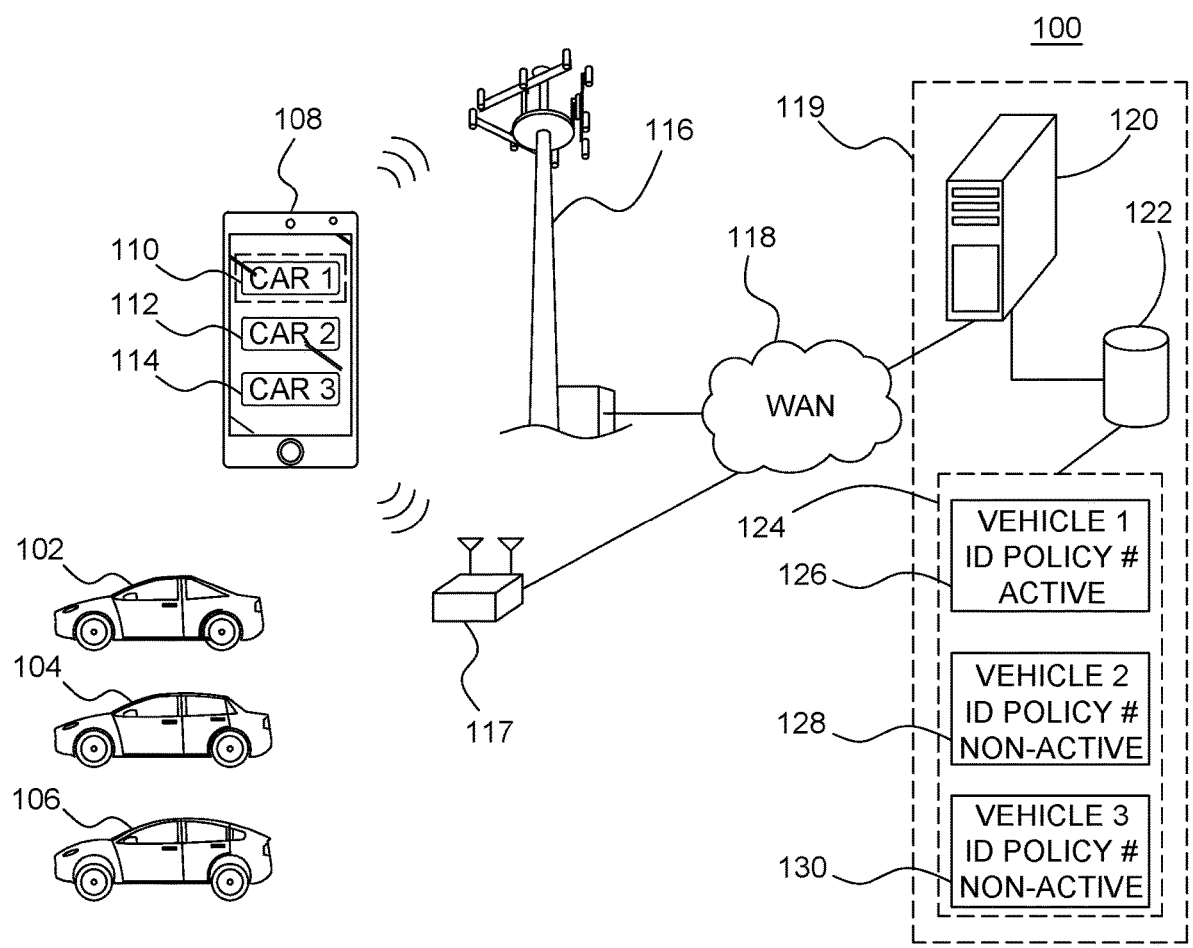
FIG. 1 is a system diagram for dynamically adjusting an automobile insurance policy by turning on or off active coverage for a selected automobile or automobiles, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and useful technology for dynamically changing insurance coverage for an automobile insurance policy. In particular, it provides a technology that allows a policyholder to turn coverage on or off on a given automobile covered on a multi-automobile policy. Since a person cannot drive more than one automobile at a time, a person who owns several automobiles would prefer to not have to pay for full coverage on all of the cars they own at all times. A base coverage to protect against theft or damage is all that is needed for an automobile that is not being driven. With the presently disclosed technology, a policy holder can dynamically select and "turn on" additional, active coverage for an automobile they intend to drive on a given day, and likewise turn off the active coverage upon arriving home.

FIG. 1 is a system diagram for dynamically adjusting an automobile insurance policy by turning on or off active coverage for a selected automobile or automobiles, in accordance with some embodiments. The system 100 includes equipment owned and operated by a policy holder, and equipment owned and operated by an insurance provider that provides automobile insurance to the policy holder. The policy holder can own a plurality of automobiles 102, 104, 106. Each of these automobiles 102, 104, 106 are roadworthy vehicle licensed and registered for use on public roadways, and are subject to an insurance policy which has selectively activated coverage, subject to verification.

To enable (or disable) coverage on a given automobile 102, 104, 106, a user can use a mobile device 108, such as a tablet computer or a cellular telephone device running an application program that presents a graphic user interface (GUI) including a plurality of interface objects 110, 112, 114. The interface objects are GUI elements that cause a pre-selected processing task to occur once selected by a user. In this example, interface object 110, 112, 114 each correspond to automobiles 102, 104, 16, respectively. The GUI interface in which interface objects 110, 112, 114 are presented is provided by an application program designed to allow a user to select an automobile covered by a base automobile insurance policy from among a plurality of automobiles covered by the base policy, and either activate ("turn on") or deactivate ("turn off") active coverage. As used here the term "active coverage" refers to insurance coverage that allows the automobile to be legally driven on public roads, and which insures against risk of collision and liability for collision. Automobiles that are not being driven (e.g. left in a garage) do not need active coverage, but may have a base coverage that protects against theft or damage due to, for example, weather events or other "acts of God."

By selecting one of the interface objects 110, 112, 114, the user is toggling the state of active insurance for the automobile corresponding to the selected interface object. The mobile device 108 is able to communicate over a wide area network 118, such as the Internet, by accessing, for example, a cellular data network 116, or a WiFi access point 117, or any other known networking means. The mobile device, under control of the dynamic insurance application program code, can connect to a web services data center 119 that includes an insurance server 120. The insurance server 120 can be an abstraction of front end web service equipment for interacting with client devices such as mobile device 108. The insurance server 120 relays requests, data, and other information to a backend 122, which includes a database. The backend 122 updates and makes changes to insurance records, among other tasks. For example, there can be a policy record 124 for an insured entity (e.g. the owner of mobile device 108). The policy record 124 can indicate the type of coverage and various coverage limits and deductibles, and can indicate a plurality of automobiles covered by the policy, as indicated in automobile records 126, 128, 130, which can correspond to automobiles 102, 104, 106, respectively.

The policy for the policy record 124 is a dynamic coverage policy, meaning that the insured entity can interact with the insurance company's web service server 120 to change a coverage status for a covered automobile from a base coverage to an active coverage, and have the premium adjusted accordingly. In effect, the insured entity can "turn on" and "turn off" active coverage. For example, in the present example, the user of mobile device 108 is shown three GUI objects 110, 112, 114 corresponding, respectively, to automobiles 102, 104, 106. The user wishes to turn on active insurance coverage for automobile 102, and GUI object 110 is shown highlighted, indicating that GUI object 110 has been selected. Accordingly, the insurance company web service 119 processes the selection as a request, and after the necessary verifications (e.g. that the vehicle is covered and eligible for dynamic coverage), the policy information is updated to indicate in record 126 that the coverage for automobile 102 is now active, meaning covered for public roadway driving. Similarly, the insured user can turn off active coverage when the user doesn't plan to drive the automobile on public roadways.

Figure 2:
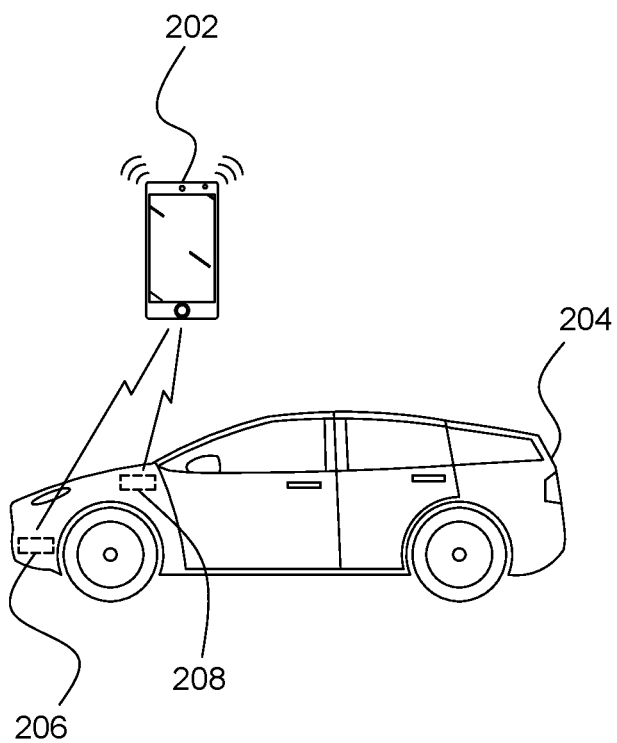
FIG. 2 is a connection diagram indicating several wireless connection modalities to connect a mobile device to an automobile in order to dynamically adjust active insurance coverage for the automobile, in accordance with some embodiments.

FIG. 2 is a connection diagram 200 indicating several wireless connection modalities to connect a mobile device to an automobile in order to dynamically adjust, or verify active insurance coverage for the automobile, in accordance with some embodiments. For example, in automobile 204, there can be several wireless components that can be connected to by a mobile device 202. A common wireless component that is provided in most automobiles presently manufactured is the audio system 208. The audio system 208 can wirelessly connect to the mobile device 202 to enable hands-free calling and playing music stored on the mobile device 202, for example. The wireless connection is typically performed using the BlueTooth protocol, which is described under specification 802.15.1 of the Institute of Electrical and Electronic Engineers (IEEE), and which is known as a personal area wireless network (PAN) protocol. Another example of a wireless component can be a wireless telematics unit 206, which can also use a PAN protocol for connecting to other devices, including mobile device 202. The wireless telematics unit 206 can be mounted in the automobile 204 as an aftermarket component, and can connect to the vehicle computer. In some cases the wireless telematics unit 206 can connect to an ODB port of the automobile 204.

In order to adjust or verify insurance coverage for the automobile 204, upon the user getting into the automobile 204 and turning it on, the mobile device 202 automatically can connect to one of the wireless components 206, 208, and as a result, an insurance application program can become aware of the connection. For example, in the Android operating system, the BlueTooth system updates a list of connected devices, and that list can be accessed by application programs. Upon connecting, the wireless component 206, 208 provides its unique media access control (MAC) address to the mobile device 202. The MAC address of the audio component 208 can be used to identify the automobile 204. The MAC address of the wireless telematics unit 206, can be associated with the automobile 204. A user can set up records locally in the mobile device 202 by associating one of the wireless components 206, 208 with the automobile 204, and with user's insurance policy.

Figure 3:
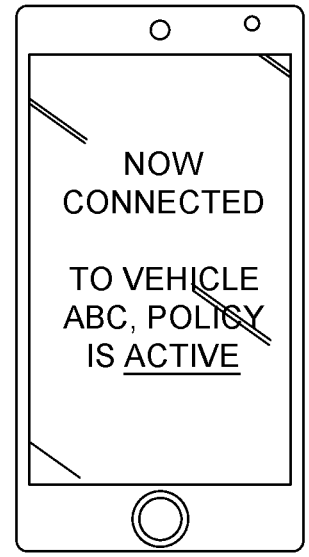
FIG. 3 is an interface diagram for displaying an insurance coverage status for an automobile having dynamic insurance coverage, in accordance with some embodiments.

Upon detecting the connection to the wireless component 206, 208, the insurance application program running on the mobile device 202 can check to see whether the automobile 204 is presently being actively covered under a policy by accessing the insurance web service (e.g. 119 of FIG. 1), and determining the present state of coverage for the automobile 204. If the automobile 204 is presently covered for active coverage, then the mobile device 202 can indicate that the automobile 204 is presently actively covered, as shown in FIG. 3, for example. If the automobile 204 is not presently covered for active insurance, then the insurance application program can prompt the user as to whether the user wants to commence active coverage of the automobile 204 such as by displaying a prompt stating, for example, "this vehicle is not presently on active coverage, do you want to activate coverage now?" and present corresponding "yes" and "no" radio buttons on the interface which can be used to by the user to indicate a selection.

FIG. 4 is an interface diagram 400 for displaying a login screen to allow a user to dynamically change automobile insurance coverage, in accordance with some embodiments. Upon downloading and installing the insurance application program, the user can enter their user name 402 and password 404 in order to allow the insurance application program to access the user's insurance records and data. Upon logging in with authenticated credentials, the user may be presented with an interface similar to the interface diagram 500 of FIG. 5, in which each of the user's insured vehicles are listed in GUI objects 502, 504, 506, for example. Next to each GUI object for each automobile is a graphical toggle switch 508, 510, 512 that can allow the user to toggle the active coverage on or off. In FIG. 5, all of the automobiles 502, 504, 506 are shown in a state of having only base coverage (or no coverage). If additional automobiles are covered under the dynamic policy, then a scroll bar 512 can be used to scroll down the list to display additional automobiles.

Figure 6:
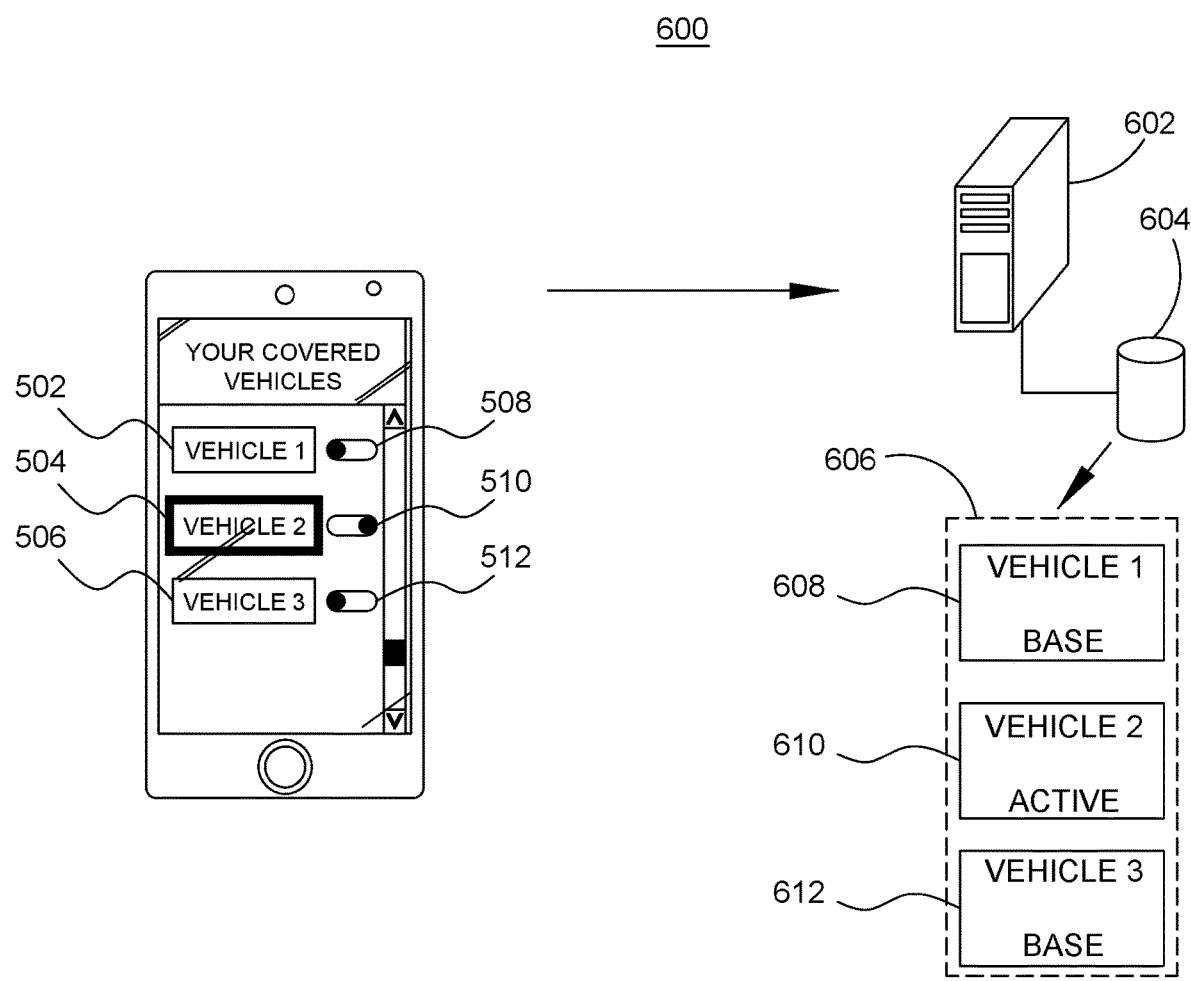
FIG. 6 is an interface diagram for displaying a selection screen for changing active insurance coverage for an automobile and updating an insurance record, in accordance with some embodiments.

FIG. 6 is an interface diagram 600 for displaying a selection screen for changing active insurance coverage for an automobile and updating an insurance record, in accordance with some embodiments. Using the interface shown in FIG. 5, the user can toggle coverage from base to active by actuating or interacting with the corresponding toggle element. In the present example the user has changed toggle element 510 from a base setting to an active setting. In response, the insurance application program can graphically confirm the selection by highlighting corresponding GUI object 504. The selection is transmitted by the mobile device to the insurance web service data center front end server 602, which processes the selection through a backend 604 by changing the status in the corresponding record 610 of the user's policy 606. Other vehicle records 608, 612 remain in the base coverage state. Similarly, by actuating toggle element 510 again, the active coverage can be turned off, assuming any minimum period for active coverage required by the policy provider has elapsed. Thus, FIGS. 5 and 6 show one example of how a mobile device can be used to interact with an insurer to change the status of insurance coverage from a base level to an active status, and vice versa.

Figure 7:
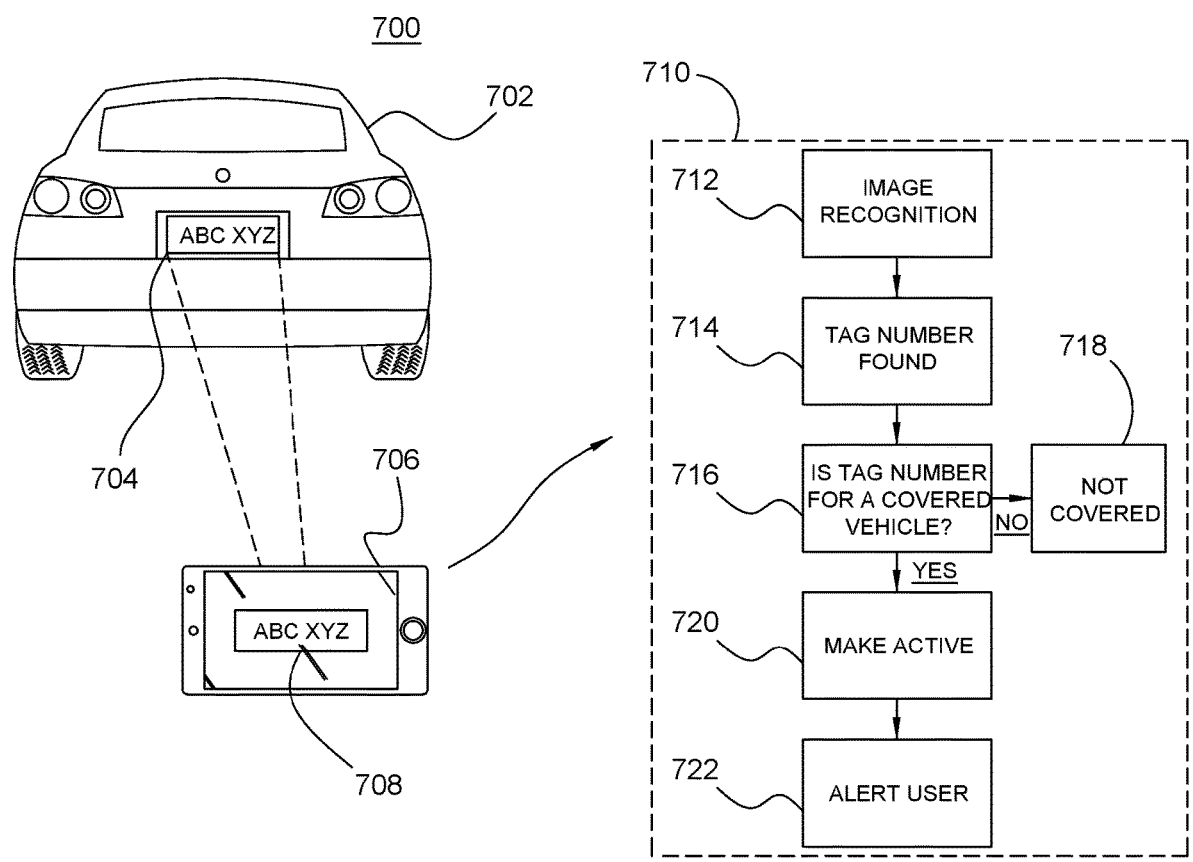
FIG. 7 shows an image recognition process for verifying a covered automobile of a multi-automobile policy having dynamic active coverage, in accordance with some embodiments.

FIG. 7 shows an image recognition process 700 for activating a covered automobile of a multi-automobile policy having dynamic active coverage, in accordance with some embodiments. Some automobiles may lack a wireless component to which the mobile device can connect to determine the identity of an automobile. Older automobiles do not have a BlueTooth enabled audio system, and the use may not wish to add a telematics unit to the automobile. However, a road legal automobile 702 will have a license plate or tag 704 that uniquely identifies the automobile 702. A mobile device 706 running an insurance application program that accesses a camera of the mobile device 706 can capture an image 708 of the tag 704. That it, the insurance application program includes an option to capture a tag image, as directed by the user. The insurance application program is able call a camera application to capture the image 708. Once captured, the image 708 is used by the insurance application program rather than being stored in an image gallery directory, as would be the case if the user were taking snapshots to keep. Since the insurance application program calls the camera application of the mobile device, the image captured is not a stored image, so there is a higher likelihood that the image is of the actual license tag and that the image was produced by the user holding the mobile device such that the license tag is in view of the camera at the time the image is captured, and therefore the user is in physical proximity to the automobile. The insurance application program can then perform an image recognition process on the captured tag image 708 as indicated in process 710.

An image recognition step 712 is first performed to determine the tag number/identifier in alphanumeric text. In step 714 the insurance application program running on the mobile device 706 can then compare the recognized tag number with locally or remotely kept tag number records for automobiles covered by the user's insurance policy. In step 716 the insurance application program makes a determination as to whether the recognized tag number is one for a covered automobile. If it is not covered, or if coverage has lapsed, then the insurance application program and can prompt the user and indicate that the automobile is not presently covered with a dynamic policy in step 718. If the recognized tag number is the same as one that is covered by a dynamic policy, then in step 720 the insurance application program can change the coverage from a base coverage to an active coverage, and then alert the user in step 722 to confirm the active coverage, such as by displaying text indicating such.

Figure 8:
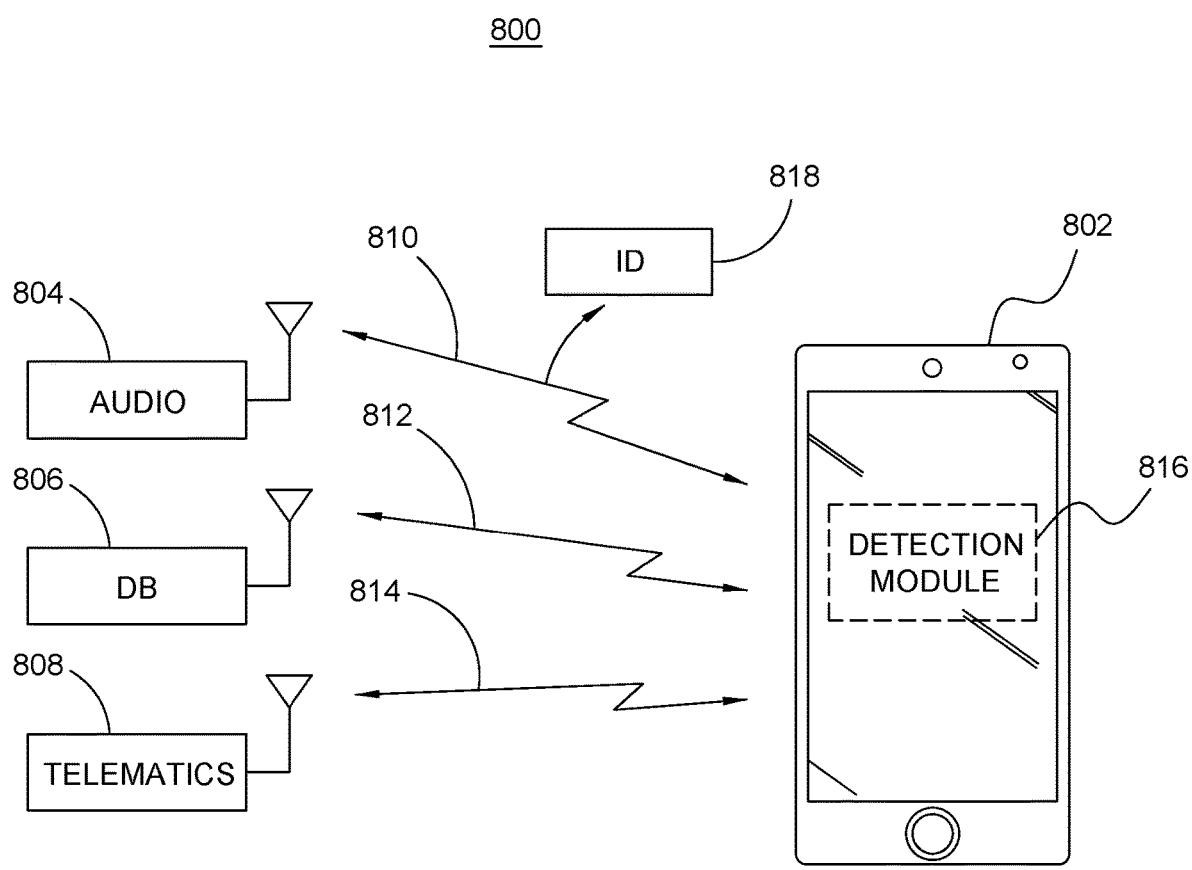
FIG. 8 is an interface diagram of a detection interface for detecting and verifying an automobile for a multi-automobile policy having dynamic active coverage, in accordance with some embodiments.

FIG. 8 is an interface diagram 800 of a detection interface for detecting and verifying an automobile for a multi-automobile policy having dynamic active coverage, in accordance with some embodiments. As indicated in FIG. 2, a mobile device 802 can automatically detect and connect to one or more wireless components of an automobile. For example, the automobile can have a wireless audio system 804, a wireless dongle 806 that can be connected to the automobile's OBD port connector, or a wireless telematics unit 808. Each of wireless components 804, 806, 808 can communicate wirelessly, such as by using radio signals 810, 812, 814, respectively, in accordance with an established communication protocol. Typically, the communication is performed using a commonly known PAN protocol such as BlueTooth, Zigbee, or similar known protocols. A detection module 816 of the insurance application program can monitor, for example, a list of connected devices provided by the operating system or communication stack of the mobile device 802, and every time a new device is connected the detection module can compare an identifier of the newly connected device to a list of identifiers associated with covered automobile. For example, when a device such as audio component 804 connects to the mobile device 802, a MAC address 818 is transmitted to the mobile device 802, and specifically to the transceiver of the mobile device used to communicate with the audio component 804. The identifier 818 is obtained by the detection module 816 and compared to known identifiers, either locally or the identifier can be sent to a remote processor such as the insurance web service data center. Once the status of the automobile is determined, then the insurance application program can proceed with the next step.

Figure 9:
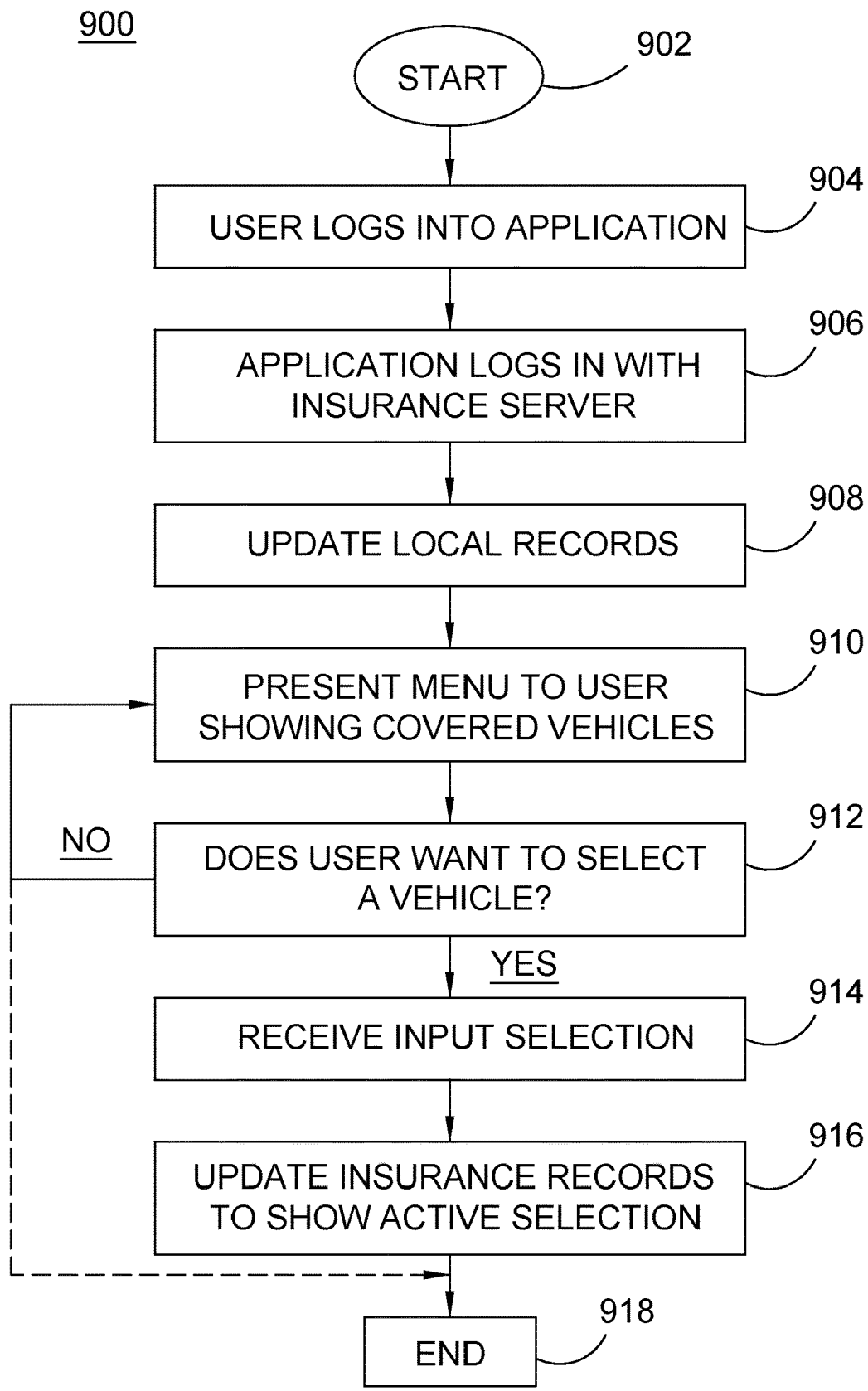
FIG. 9 is a flow chart diagram of a method for selecting an automobile of a multi-automobile policy having dynamic active coverage, in accordance with some embodiments.

FIG. 9 is a flow chart diagram of a method 900 for selecting an automobile of a multi-automobile policy having dynamic active coverage, in accordance with some embodiments. The method 900 can be performed, for example, on a mobile device or other computing device running an insurance application program, or accessing an insurance web service data center using a browser. At the start 902 the user has a device suitable for connecting to the insurance web service data center, including, for example, an installed insurance application program or web browser. In step 904 the user can log into an application program on a mobile device, or a login screen on a browser by providing, for example, a user name and password. In step 906 the login credentials are passed to the insurance web server front end server to log the user in to the user's account. In step 908 any locally maintained records can be synchronized with the records of the insurance web service. That is, and deletions or additions of automobile records, any changes in active coverage, and so on. In step 910 a menu can be presented to the user that shows the automobiles covered by the user's policy and their present coverage status. The menu can include selectable interface objects associated with each automobile covered by the policy. In steps 912 and 914, the user can make a selection of one of the vehicle to change its present coverage status from a base coverage to an active coverage, and vice versa. Specifically, in step 914, a user selection can be received, and in step 916 the insurance status and record for the selected automobile can be updated, and the method can then end in 918.

When the user changes an automobile coverage status from, for example, a base status to an active status, a higher premium will be due reflecting the higher risk associated with driving the automobile on public roads. After step 914 the method 900 can also prompt the user with a premium amount due in order to activate the coverage, and the user must accept and pay the premium in order for the active coverage to commence.

Figure 10:
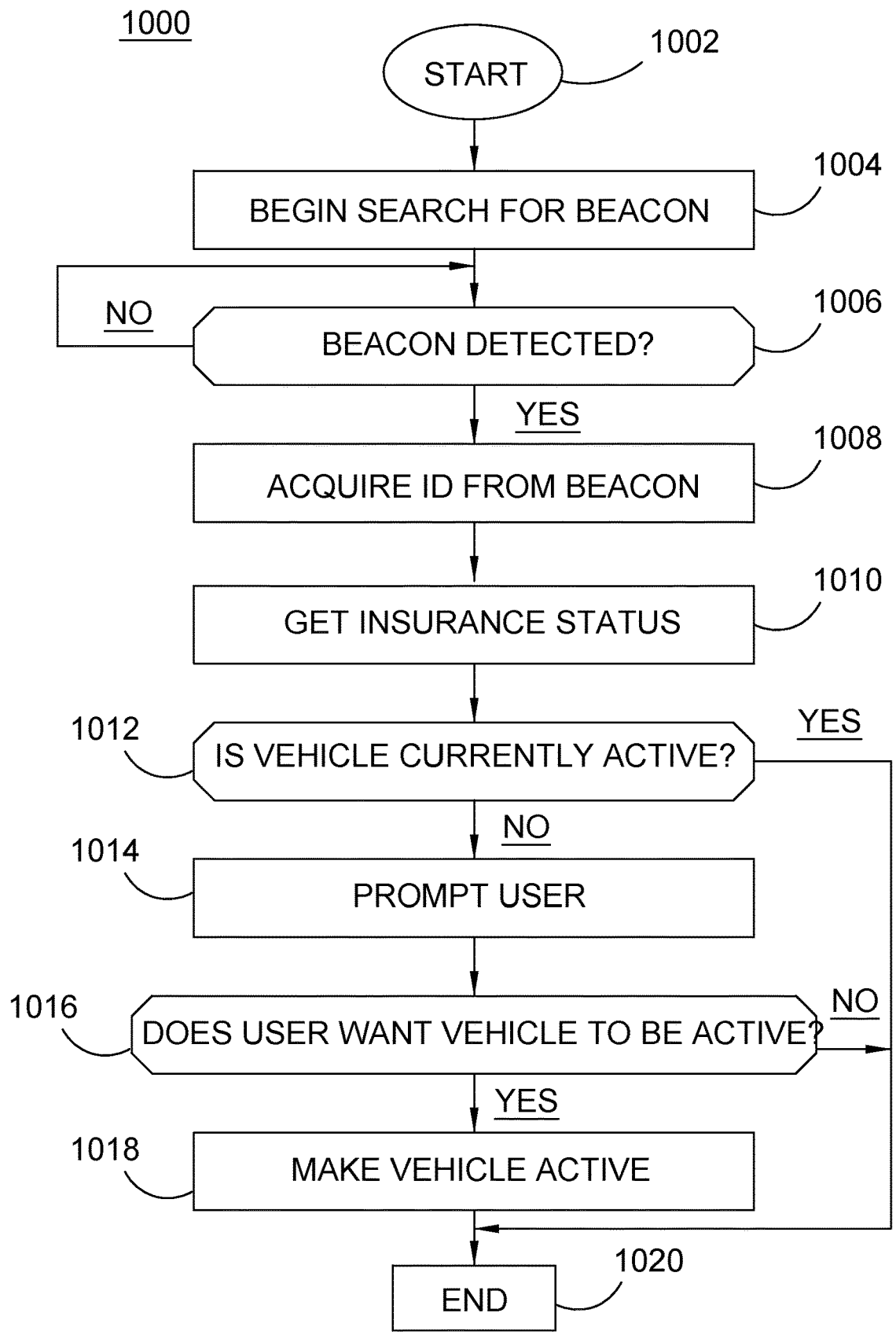
FIG. 10 is a flow chart diagram of a method for verifying an automobile of a multi-automobile policy having dynamic active coverage, in accordance with some embodiments.

FIG. 10 is a flow chart diagram of a method 1000 for verifying an automobile of a multi-automobile policy having dynamic active coverage, in accordance with some embodiments. Specifically, method 1000 uses a mobile device that detects the presence of an automobile. Thus, at the start 1002, the mobile device is powered on and running an insurance application program. In step 1004 a short range wireless transceiver of the mobile device, such as a BlueTooth transceiver, commences looking for a beacon of the automobile's wireless component, and in step 1006 the method 1000 determines whether a beacon is detected. The beacon is simply a signal transmitted by the wireless component; it can be an unsolicited beacon or a solicited beacon. A solicited beacon means that the wireless component responds to a transmission, and an unsolicited beacon means the wireless component transmits in an attempt to provoke an answer/response from another device. Once a beacon is detected by the mobile device, certain information is then acquired from the beacon, including an identifier. Alternatively the identifier can be acquired in response to a connection procedure where the mobile device and wireless component of the automobile establish a link in accordance with the communication protocol. Thus, in step 1008, the identifier of the automobile, or the wireless component of the automobile, is acquired by the insurance application program. Steps 1004-1008 can occur by, for example, the automobile being started up, and powering up the wireless component(s).

In step 1010 the automobile insurance program determines the present insurance coverage status of the automobile and whether it presently covered. In step 1012 the method 1000 determines whether the insurance for the automobile is presently in an active status. If the automobile insurance status is presently active, then the method can proceed to the end 1020 on the assumption that the user will be driving the automobile. If, in step 1012, however, it is determined that the automobile is not presently under an active coverage, then the method 1000 can proceed to step 1014 where the mobile device can prompt the user to determine if the user wants to turn on active coverage for the automobile. In step 1016 a user selection or input is evaluated to determine whether the user has selected to turn on active coverage or not. If not, then the method proceeds from step 1016 to the end 1020, otherwise the method proceeds to an activation process in step 1018 to change the insurance status of the automobile to active coverage. Step 1018 may include requiring the user to pay, or agree to pay, an indicated premium amount.

Figure 11:
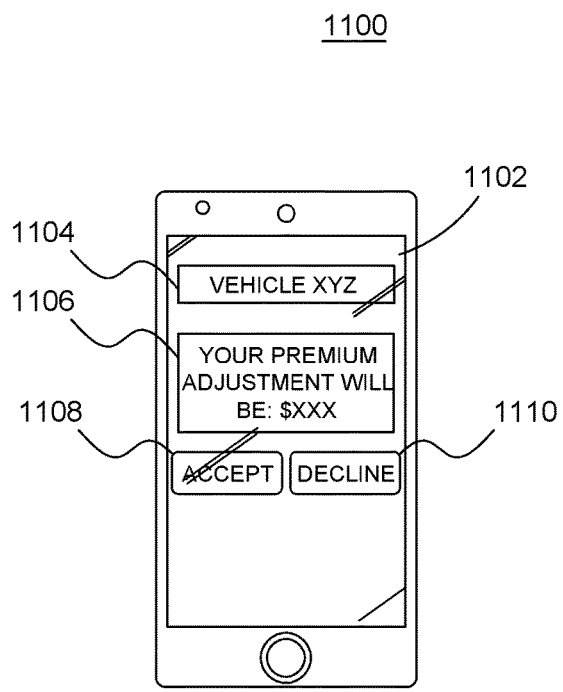
FIG. 11 is an interface diagram for accepting a premium upon activating coverage on an automobile of a multi-automobile policy having dynamic active coverage, in accordance with some embodiments.

FIG. 11 is an interface diagram 1100 for accepting a premium upon activating coverage on an automobile of a multi-automobile policy having dynamic active coverage, in accordance with some embodiments. The interface diagram can be one that is rendered on the mobile device display 1102 in step 1018 of method 1000, for example. The interface can display an identity of the automobile that has been detected, in a name field 1104, in response to the mobile device connecting to a wireless component of the automobile. In another portion or field of the interface, a premium message 1106 can be displayed, indicating the premium that will be charged (e.g. by the day, week, or other time period) in order to change the coverage to active coverage. Interface button selectors 1108, 1110 allow the user to accept or decline the premium and active coverage. Thus, upon the user entering and turning on an automobile the is covered under the user's policy, but which does not presently have active coverage, the user's device can display an interface similar to interface 1100. Furthermore, the mobile device can determine whether it is moving or not, such as by using satellite positioning signals received at a satellite positioning receiver of the mobile device, and if it is moving while connected t the wireless component of the automobile, and the user has not accepted the active coverage conditions (e.g. the premium amount), the insurance application program can alert the user that active coverage is not in place, and that the user is responsible for any potential claim that might otherwise be covered by active coverage.

Figure 12:
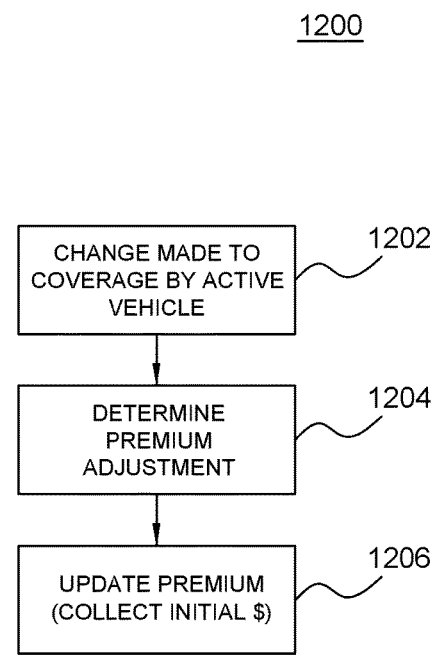
FIG. 12 is a flow chart diagram of a method for determining a premium change when an automobile is selected for active coverage, in accordance with some embodiments.

FIG. 12 is a flow chart diagram of a method 1200 for determining a premium change when an automobile is selected for active coverage, in accordance with some embodiments. The method 1200 is performed at the insurance web service data center, which is accessed by, for example, a mobile device, during a requested change procedure. In step 1202 the web service receives a request to change the coverage of an automobile to an active coverage status. In response, in step 1204, the insurance web service determines a premium adjustment that must be paid for the active coverage. In step 1206 the user can be shown the premium adjustment amount, and agree to pay (or actually commence paying) the premium amount, such as by selecting "accept" at an interface on the user's mobile device during the process.

Figure 13:
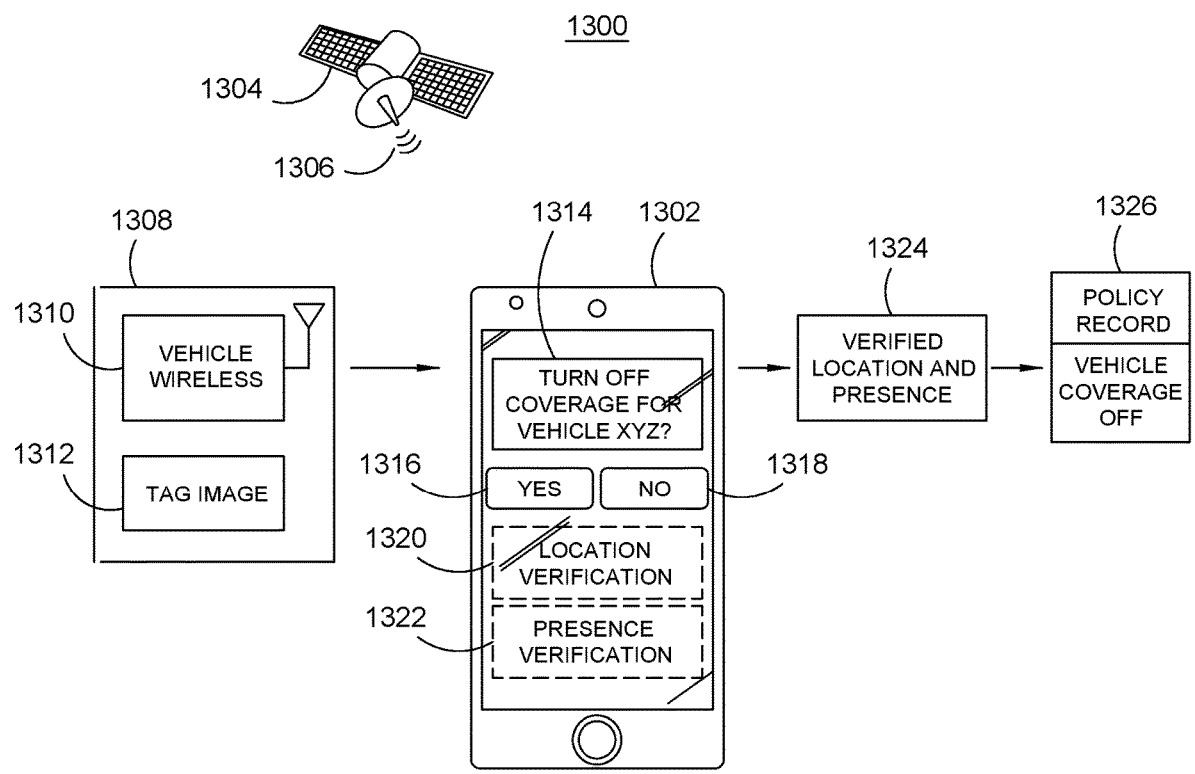
FIG. 13 is a system diagram illustrating a technology for verifying automobile location and presence in order to turn off active coverage on the automobile, in accordance with some embodiments.

FIG. 13 is a system diagram 1300 illustrating a technology for verifying automobile location and presence in order to turn off active coverage on the automobile, in accordance with some embodiments. An insurer may enforce a policy provision that active coverage can only be turned off by the user when the automobile is at its home location. This can be done by determining a location of the mobile device 1302 while it is in the presence of the automobile 1308. For example, mobile device 1302 can include a satellite positioning receiver that receives positioning signals 1306 from positioning satellites 1304. The vehicle presence can be verified by, for example, the mobile device 1308 being connected to a wireless component 1310 of the automobile 1308. Alternatively, the insurance application program can be used to capture an image of the automobile license tag to produce a tag image 1312. Because the insurance application program controls the image capture, the user cannot use an old image. The tag number can be recognized from the tag image to verify the automobile's presence at the time the image was taken.

The insurance application program can provide an interface to allow the user to turn off active coverage, and include, for example, a prompt 1314 asking the user to confirm whether the user wants to turn off active coverage. Interface elements 1316, 1318 can allow the user to agree or not with the prompt, inputting the user's selection. In background processes the insurance application program can perform location verification 1320 and presence verification 1322 to ensure that the mobile device is at an acceptable location to turn off active coverage, and that the covered automobile is in the presence of the mobile device as verified by either a wireless connection or the image processing of the license tag. Once the insurance application program has verified location and vehicle presence, then the insurance application program can send verification information and the turn off request 1324 to the insurance web service, which in turn updates the policy record 1326 to indicate that the automobile is no longer under active coverage.

Accordingly, the inventive embodiments disclosed wherein provide the benefit of allowing multiple automobiles to be insured on a policy where only an actively used automobile has active insurance coverage, thereby allowing more competitive policies for owners of multiple automobiles. The embodiments further include a technology for allowing a user to select which of their automobiles are actively covered, as well as to turn off active coverage. Further, a technology is disclosed that allows for identification of a vehicle being used, and verifying that insurance coverage is active, and if it is not active, allowing a user to active coverage in order to operate the automobile on public roads.

What is claimed is:

1. A method for dynamically updating information for an automobile insurance policy for a plurality of automobiles to indicate an actively covered one of the plurality of automobiles, wherein all of the plurality of automobiles are subject to a base policy coverage under the automobile insurance policy and wherein only one of the plurality of automobiles can be an active, and wherein any one of the plurality of automobiles can be selected to be the actively covered automobile at any time by a user, the method comprising:

receiving, at a mobile device, an identifier associated with a specific automobile of the plurality of automobiles presently covered under the automobile insurance policy;

the mobile device transmitting the identifier to a policy management processor, the policy management processor being configured to manage and determine a premium for a policy covering the specific automobile and at least one other automobile under the automobile insurance policy;

in response to receiving the identify identifier from the mobile device, the policy management processor updating a record associated with the specific automobile to indicate that the specific automobile is active and in use and wherein the at least one other automobile is not active on the automobile insurance policy;

the policy management processor determining a premium based on the specific automobile being active for a period of time;

detecting, by the mobile device, that the specific automobile has been started; and in response to detecting that the specific automobile has been started, the mobile device indicating that the specific automobile is active under the automobile insurance policy.

2. The method of claim 1, wherein receiving the identifier of the specific automobile comprises the mobile device detecting a connection to a personal area wireless network transceiver of the specific automobile.

3. The method of claim 2, wherein receiving the identifier comprises receiving a media access controller address of the personal area wireless network transceiver as the identifier.

4. The method of claim 2, wherein the personal area wireless network transceiver provides the identifier to the mobile device as a vehicle identification number.

5. The method of claim 1, wherein receiving the identifier of the specific automobile comprises the mobile device detecting and connecting to a telematics unit of the specific automobile and receiving the identifier from the telematics unit.

6. The method of claim 5, wherein the identifier provided by the telematics unit is a vehicle identification number of the specific automobile.

7. The method of claim 1, wherein automatically receiving the identifier of the specific automobile comprises connecting a personal area network transceiver that is connected to an on board diagnostic connector of the specific automobile and receiving the identifier from the personal area network transceiver that is connected to an on board diagnostic connector.

8. The method of claim 1, wherein receiving the identifier of the specific automobile comprises performing an image recognition process on an image captured by the mobile device and recognizing the identifier in the image.

9. The method of claim 8, wherein the image is an image of a license tag of the specific automobile, recognizing the identifier in the image comprises recognizing a license tag number of the license tag.

10. The method of claim 8, wherein the image is an image of a pictographic code associated with the specific automobile, recognizing the identifier in the image comprises recognizing the pictographic code and decoding information from the pictographic code to obtain the identifier.

* * * * *